United States Patent [19]

Schmidt

[11] 4,243,957
[45] Jan. 6, 1981

[54] UNIVERSAL EQUALIZER

[75] Inventor: Hans-Joachim Schmidt, Nuremberg, Fed. Rep. of Germany

[73] Assignee: Te ka De Felten & Guilleaume Fernmeldeanlagen GmbH, Nuremberg, Fed. Rep. of Germany

[21] Appl. No.: 928,884

[22] Filed: Jul. 28, 1978

Related U.S. Application Data

[63] Continuation of Ser. No. 881,510, Feb. 27, 1978, abandoned, which is a continuation of Ser. No. 724,614, Sep. 20, 1976, abandoned.

[30] Foreign Application Priority Data

Sep. 20, 1975 [DE] Fed. Rep. of Germany ....... 2541977

[51] Int. Cl.³ ............................................. H03H 7/03
[52] U.S. Cl. .................................... 333/28 R; 333/175
[58] Field of Search ..................................... 333/28 R

[56] References Cited

U.S. PATENT DOCUMENTS

3,551,854  12/1970  Endo et al. ...................... 333/28 R
3,750,052  7/1973  Hermanutz ........................ 333/28 R
3,794,936  2/1974  Poschenrieder .................... 333/28 R Primary Examiner—Paul L. Gensler
Attorney, Agent, or Firm—Michael J. Striker

[57] ABSTRACT

An equalizer introduces into the attenuation versus frequency curve of a signal carrier transmission system compensatory bumps of adjustable magnitude and of adjustable frequency location. When the bumps are in their initial frequency locations, they exhibit the following features: (a) The middle frequencies of the bumps are each shiftable with respect to frequency by an amount equal to at least one half the frequency interval to the respective neighboring bump. (b) Adjoining bumps of equal magnitude have facing flanks which overlap and intersect at a point which is at least 0.6 of the way up the height of the bump. (c) The middle frequencies of the individual bumps are distributed within the frequency range to be equalized in at least approximate correspondence to the detail density distribution function d*. The function d* is a novel function defined herein.

3 Claims, 10 Drawing Figures

# UNIVERSAL EQUALIZER

BACKGROUND OF THE INVENTION

The invention relates to an arrangement for equalizing the attenuation versus frequency curve of a signal carrier transmission system within a predetermined frequency range.

It is already known to equalize the attenuation versus frequency curves of transmission systems utilizing equalizers based upon the echo principle, the cosine principle and utilizing equalizers having attenuation versus frequency curves exhibiting adjustable-amplitude attenuation bumps (elevations and depressions). Such equalizers are capable of equalizing the attenuation versus frequency curve of signal carrier transmission systems exhibiting unpredictable frequency distortion, to the extent that the equalizers have a resolving power sufficiently great for the details of the attenuation versus frequency curves. This type of equalizer is referred to herein as a universal equalizer. The universality of such an equalizer is attributable to the type of theoretical considerations associated with the particular equalizer type: the use of Fourier analysis in the case of echo equalizers, the use of the sampling theorem in the case of adjustable-bump equalizers.

Federal Republic of Germany Pat. No. 1,805,461 discloses an equalizer into whose attenuation versus frequency curve there can be introduced a plurality of attenuation curve bumps of adjustable magnitude and lateral position (relative to the frequency axis) by utilizing adjusting components. However, that patent contains no information concerning the use of such equalizers as universal equalizers.

It is a general object of the invention to provide a universal equalizer arrangement, for equalizing the attenuation versus frequency curves of signal carrier transmission systems, of a novel design such as to inherently be considerably less expensive than comparable equalizers of the prior art.

Preliminary to setting forth the essential characteristics of the novel equalizer, it is necessary to define certain novel concepts which are utilized in the following discussion. The purpose of these novel concepts is to establish a standard which can be applied to any universal equalizer design in order to quantitatively characterize the degree of difficulty involved in the establishment of the required equalization and the cost of providing the necessary equalization (i.e., as expressed in the number of echoes or attenuation curve bumps to be utilized).

Figure 1:
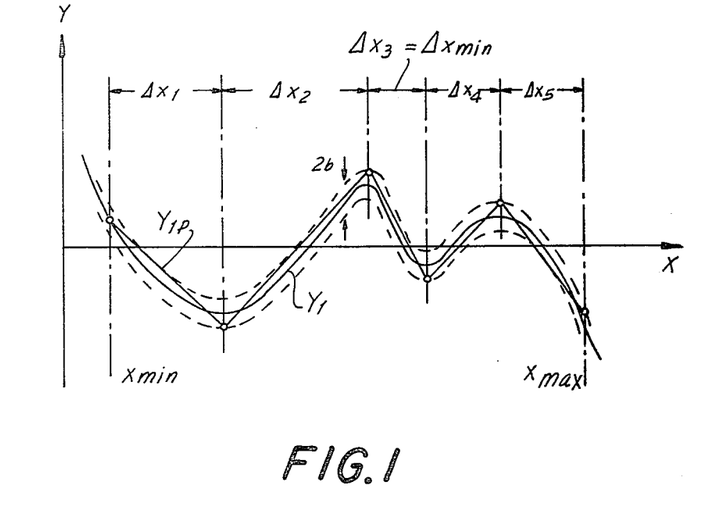
FIG. 1 depicts the attenuation versus frequency curve of a signal carrier transmission system, and also the manner in which this curve can be piecewise linearlized.

The explanation of the concepts involved will be made with respect to a simple conceptual model depicted in FIG. 1. There, the attenuation versus frequency curve of a signal carrier transmission system is designated by y1. Within the frequency limits $y_{min}$ and $x_{max}$ the curve y1 is approximated by a curve y1p having a polygonal course. The approximation curve y1p is so established that both the extreme values of the error function $f1 = y1 - y1p$ equal the predetermined amount b. The polygonal approximation curve accordingly varies about the actual frequency response curve y1 within a tolerance range having a breadth (measured along the y axis) of 2b. The function y1 is approximated piecewise utilizing straight-line segments whose end points are the vertex points of the polygonal approximation curve. The distance, measured along the abscissa, between two adjoining vertex points is referred to herein as a band $\Delta x$. Clearly, for frequency functions full of graphical detail, the frequency curve will include many small bands; as the richness of detail of the functions considered increases, the bands become narrower and their number becomes greater. Accordingly, the widths of these bands can be used to characterize the richness or density of detail of the frequency curves in question. Let the density of detail be defined as $d = x_{max}/\Delta x$. The highest density of detail of the attenuation versus frequency curve of a transmission system is determined by the narrowest band $\Delta x_{min}$ of such curve and can be had from the equation $d_{max} = x_{max}/\Delta x_{min}$.

Summarizing thus far, an attenuation versus frequency curve y1 to be equalized can be described by reference to a selectable tolerance range $\pm b$ and by reference to the limit values of a plurality of component bands and the vertex points of the polygonal approximation curve located at such limit values.

Analogously, the attenuation versus frequency curve of an equalizer can equivalently within the same tolerance limits ±b be represented by a polygonal curve y2p having component band limit values at which curve vertex points are located. The equalization occurs when yp2=−y1p.

The band limit values and vertex points of a frequency curve y1 can have certain characteristic features. If such a frequency curve is to be simulated by another function y2, then the latter must have component band limit values and vertex points with at least the same features. The features of frequency response curves of carrier signal transmission systems exhibiting unpredeterminable frequency distortion are to be seen in the fact that the positions of the component band limit values and the ordinate values of the vertex points of the polygonal approximation curve can be located anywhere; only the width $\Delta x_{min}$ of the narrowest component band is to be predetermined so as to constitute a characterization of the resolving power of the equalizer.

Figure 2:
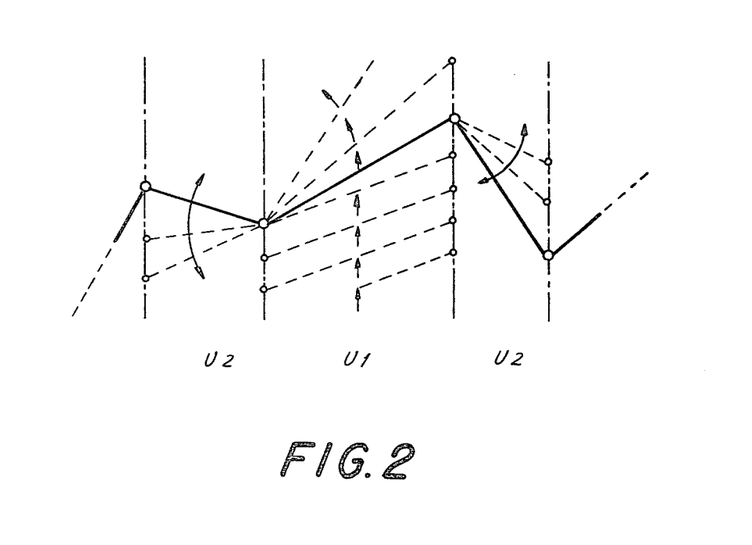
FIG. 2 is a graph indicating the criterion for a universal equalizer.

The attenuation versus frequency curve of an equalizer of the type in question must have exactly these features. This will indeed be the case when the following universality criteria are met (FIG. 2): Within a band of arbitrary location and width, a straight line segment (U1) of arbitrary location and orientation (with its end points lying on the limit value lines of the band) is to be capable of being at least approximately simulated, and at the ends of this line segment neighboring line segments (U2) must be capable of being joined on with any orientation and within a band of any width.

The invention makes use of a two-terminal-pair equalizer provided with adjusting components by means of which a number of attenuation-curve bumps of adjustable amplitude and lateral position can be established. Based upon theoretical considerations which have been confirmed in actual experiments, it has been determined that such an equalizer will meet the aforementioned universality criteria if the first two features characteristic of the invention are present: the middle frequencies of the attenuation-curve bumps relative to their initial positions along the frequency axis are to be each adjustably shiftable along the frequency axis by a distance equal to at least one half the distance to the next-following attenuation-curve bump; secondly, adjoining bumps which in their initial adjustment settings are of equal amplitude are to overlap each other to such an extent that the point of intersection of the facing flanks of the two neighboring bumps is located at least 0.6 of the way up from the minimum magnitude to maximum magnitude points of the two bumps.

Experiments have indicated that the universality and the equalizing action of the equalizer is substantially independent of the shape of the attenuation-curve bumps established by the adjustable components of the equalizer. The inventive features mentioned above are applicable to any attenuation-bump bump shape which is to be encountered using practically realizable equalizers, e.g., attenuation-curve elevations and depressions generated using simple resonant circuits, or complicated bump shapes achieved by utilizing a plurality of different resonant circuits all tuned to the same frequency, e.g., in Bode networks. The aforementioned features are applicable likewise to equalizers capable only of producing bumps of elementary mathematical character, such as of cosine, cosine$^2$ or triangular shape.

When designing such an equalizer, it is evidently necessary to provide for a definite number of attenuation curve bumps within a definite frequency range, and to do so in accordance with some definite bump distribution procedure or design rule, which in the case of the present invention will be discussed below. When designing such an equalizer, the designer bases his design, inter alia, on the center position of each attenuation-curve bump relative to the frequency axis, and this center position is denoted as the initial position; to characterize the position of an attenuation-curve bump, reference is made to the frequency at which the magnitude-maximum of the bump appears, and this frequency is referred to herein as the middle frequency of the bump.

Considering an arbitrarily selected attenuation versus frequency curve, the component band of narrowest width $\Delta x_{min}$ (as defined above) could conceivably appear anywhere within the frequency range to be considered. However, on another arbitrarily selected attenuation versus frequency curve, a component band of the same frequency width may be present, but not necessarily at the same location along the frequency axis. A universal equalizer must accordingly be so designed that the narrowest band $\Delta x_{min}$, constituting a quantity determinative of the resolving power of the equalizer, can be realized at any location at all within the transmission frequency band.

With an HS bump equalizer according to the present invention (one having bumps of adjustable magnitude or height, with the bumps being adjustably shiftable in lateral or sideward direction along the frequency axis). the extreme values of the aforediscussed component bands of the frequency range under consideration coincide with the maxima of the bumps; i.e., the bump maxima are the vertex points of the adjustable equalizer curve. This makes it particularly simple to determine the number of bumps required. In view of the considerations discussed above, the number of component bands to be established is $(x_{max}-x_{min})/\Delta x_{min}$, these component bands being delimited by $(x_{max}-x_{min})/\Delta x_{min}+1$ extreme values. Accordingly, the number of bumps to be established is at least $n_{HS}=(x_{max}-x_{min})/\Delta x_{min}+1=d_{max}\cdot(1-x_{min}/x_{max})+1$. For a broad-band system $x_{min}/x_{max}<<1$, and furthermore $d_{max}>>1$, so that in such case the number of bumps to be established is given by $n_{HS}\approx d_{max}$.

Following similar reasoning, the number of bumps required for a prior-art H-type equalizer (bumps adjustable only with respect to their magnitude or height, but not their lateral position along the frequency axis) is given by the relationship $n_H\approx(2\ldots 3)\cdot d_{max}$, and for echo equalizers the number of echoes is given by $n_E\approx(1.3\ldots 2)\cdot d_{max}$.

The cost of the circuitry for a universal equalizer is mainly attributable to the cost for the components (coils, capacitors, resistors) needed for establishing the attenuation-curve bumps or the echoes. Accordingly, the number of bumps or echoes can be utilized directly as an extremely useful approximation for the purpose of comparing the potential cost of comparable equalizer designs. From the above equations it can be seen that the cost of the bump equalizer of the present invention is inherently very considerably lower than that of the other equalizers.

Figure 3:
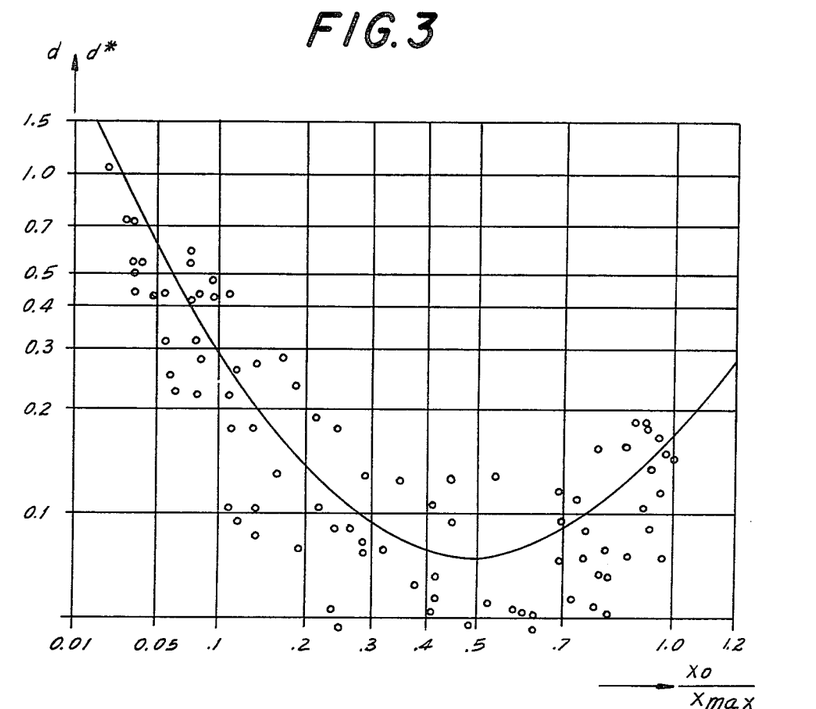
FIG. 3 is a graph showing the shape of the novel density of detail distribution function d* elucidated in the present disclosure.

The concept of density of detail has been introduced so as to provide a quantity from which the cost for an equalizer associated with such detail density can be directly calculated. Hitherto, equalizers have been designed based upon the assumption that the narrowest component gap $\Delta x_{min}$, or equivalently the highest density of detail, must be capable of realization at any point within the transmission frequency range of the system. However, experiments involving the attenuation versus frequency curves of actual broad-band transmission systems has shown the prior-art assumption to be poorly founded. The polygonal approximation curves utilized for these tests were constructed using a tolerance range having a breadth of 2b=0.4 dB. The frequency-dependent density of detail distribution resulting from these tests is depicted in FIG. 3. The ordinate value of each discrete point in FIG. 3 represents the density of detail of one gap; the abscissa value of each such point represents the geometrical middle freqency $x_0$ of the respective gap normalized with respect to $x_{max}$. The scattergram is astonishingly narrow and well defined. The average value of the scattergram is shown by the solid line $d^* = f(x_0/x_{max})$ and is referred to hereinafter as the density of detail distribution function. The shape of the $d^*$ curve graphed in FIG. 3 can be expressed as a mathematical formula as follows:

$$d^* = k \cdot 10^{[3.76q - 5.32\sqrt{q} + 2.07]}$$

wherein k is a simple proportionality constant and q is normalized frequency ($f/f_{max}$). The scattergram shows that, for component bands of signal carrier transmission system attenuation versus frequency curves, the component gap of narrowest width will be different for the different curves. The prior-art equalizers were accordingly not sufficiently economical, precisely because they were so designed as to be capable of establishing the component gap of narrowest width at locations where the narrowest width gap will never be needed. By matching the characteristics of the equalizer to the density of detail of the attenuation curve, a very considerable cost savings can be achieved. Detail density matching is to be understood to mean that the spacing between the bump middle frequencies of a number of bumps is so distributed along the frequency axis that at the locations of larger detail density the spacing between the bumps is small and at the locations of smaller detail density the spacing between the bumps is greater, the principle in question being most successful when the spacing corresponds to the empirically determined detail density distribution function $d^*$.

Because the other inventive feature, i.e., the sufficient overlapping of adjoining bump flanks, must also be achieved, the bumps will be of different respective breadths. Exact computation of the proper bump spacings and widths is relatively complicated and can be performed only by resort to iterative procedures. A direct solution of the problem, although one which is of somewhat limited exactness, is possible for example by resort to a graphical procedure. A frequency axis is established (FIG. 4) the portions of which are compressed or stretched out in correspondence to the detail density distribution function $d^*$. The locations for the bump middle frequencies along the frequency axis, for a given number of bumps, is then derivable from FIG. 4.

Figure 4:
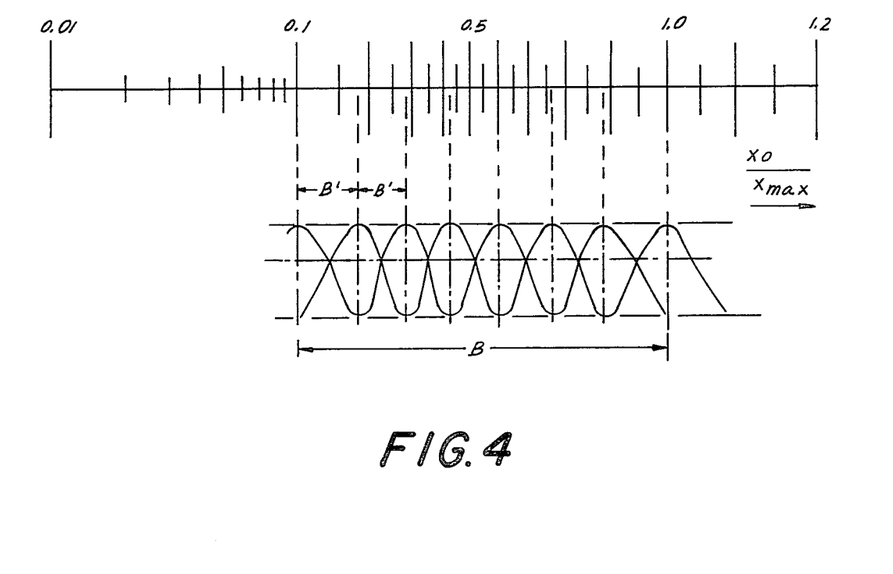
FIG. 4 is a normalized-frequency axis the constituent sections of which have been expanded and compressed in correspondence to the d* function graphed in FIG. 3, and also depicts how the middle frequencies of eight compensatory bumps are selected equidistantly spaced along this expanded and compressed normalized-frequency axis.

For example, assume that eight bumps are to be provided in the normalized frequency range $0.1 \leq x_0/x_{max} \leq 1$. The distance B between the two limits of the freqency range in question is subdivided into seven equal sections B'. The eight limit values are projected onto the compensated frequency scale, and this directly indicates the middle frequencies for the bumps (FIG. 4). An equalizer matched according to the invention to the detail density distribution curve $d^*$ requires substantially fewer bumps than an equalizer designed to make available the narrowest-width component gap at any location within the frequency range of the equalizer. The extent to which the number of bumps can be lowered and the cost reduced depends upon the band width of the system; for example, the calculated bump number for a V 2700 system is 5.7 times smaller and in the case of a V 10800 system is 2.8 times smaller.

It has already been attempted, with prior-art equalizers of the type whose compensatory bumps are of adjustable magnitude only, to reduce the number of bumps required by differently spacing the bumps one from the next (see publications 2 and 3 listed below). However, these efforts did not result in optimum equalizer designs, because there was no knowledge of the relationships between the new theoretical concept detail density and equalizer cost, disclosed for the first time herein, and because of the failure to experiment as I have done with the detail density distribution functions of transmission system attenuation versus frequency curves. With the bump middle frequencies distributed in conformity to the detail density distribution function $d^*$, the expense of introducing compensatory bumps as described in the publications mentioned herein can be reduced by about half. The inventive concept of matching the distribution of the compensatory bumps to the detail density distribution function $d^*$ can even be employed to advantage in the case of equalizers of the type whose compensatory bumps are adjustable with respect to magnitude only.

A bump equalizer of the HS type designed in conformity with the detail density distribution function $d^*$ will in every case involve a cost 2 to 3 times lower than an equalizer of the H type likewise designed in conformity to the $d^*$ function.

The detail density distribution function $d^*$ as described above was derived from the average of the scattergram values. Smaller deviations of the $d^*$ curve from the course depicted in FIG. 3 are possible, since the average cannot too readily be determined for all the frequency values. However, even when the exact average of the scattergram values cannot be determined for every individual frequency value, an equalizer designed in even approximate conformity to the detail density distribution function $d^*$ will be of greatly lowered cost.

The advantage of the inventive equalizer will be explained with respect to FIGS. 5a–5d which depict results of measurements for one particular application.

Figure 5:
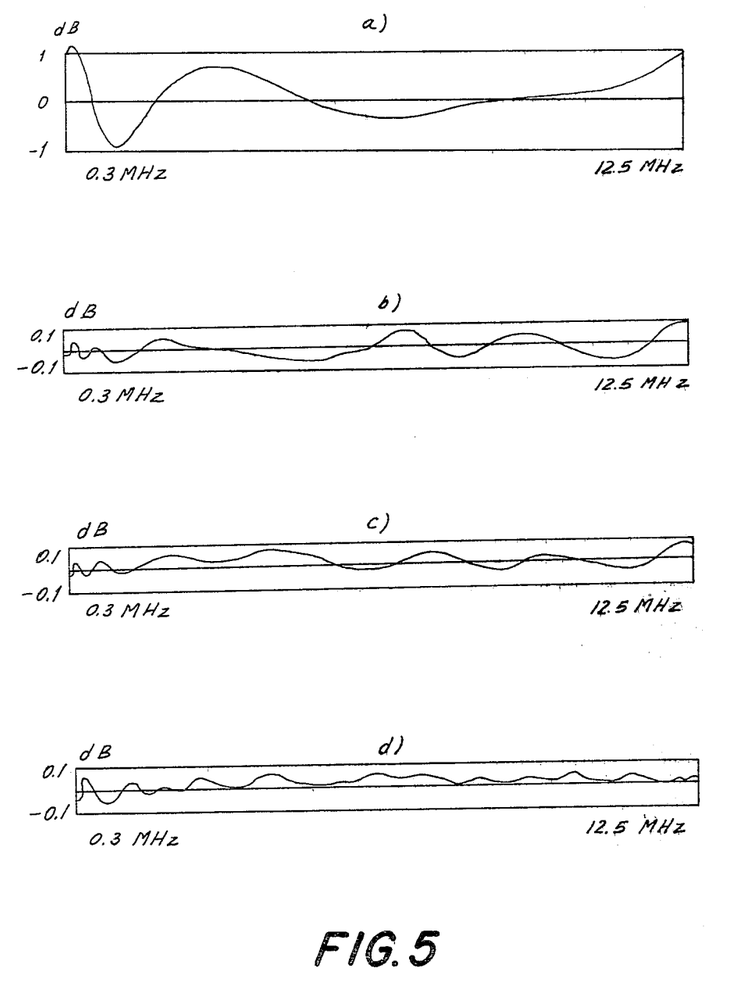
FIG. 5a depicts the unequalized attenuation versus frequency curve of an elementary transmission line.
FIG. 5b depicts the attenuation versus frequency curve of FIG. 5a, after equalization, the adjustments involved in equalization having been performed by visual means alone.
FIG. 5c depicts the attenuation versus frequency curve of FIG. 5a, after equalization, the adjustments involved in equalization having been performed using the effective-value method.
FIG. 5d depicts the compensated attenuation versus frequency curve utilizing, instead of an eight-bump equalizer designed according to the present invention, a conventional echo equalizer operative for introducing twenty-four echoes and two bumps, to show the absence of superiority of such more expensive equalizer compared to the results which can be achieved with an eight-bump equalizer designed according to the present invention.

FIG. 5a depicts the attenuation versus frequency curve of a V 2700 elementary transmission line provided with twenty repeater stations for the frequency range 0.3 to 12.5 MHz.

FIGS. 5b and 5c depict the compensated attenuation versus frequency curve after connection to the transmission system of an equalizer according to the present invention provided with eight compensatory bumps. In FIG. 5b the compensation or correction was effected by visual means, in FIG. 5c relying upon the effective-value method.

In contrast, FIG. 5d depicts the compensated attenuation versus frequency curve utilizing an available echo equalizer operative for introducing twenty-four echoes and two bumps.

The residual lack of equalization after the compensation is comparable for all curves and according to measurement lies within a range of ±0.08 dB.

Besides the advantage of lower cost for the equalizer itself, there is the advantage of a time saving attributable above all to the lower number of adjusting components which need be utilized. Using the compensation expedient of the present invention, the equalizing operation required on the average only about half as much time as was required with comparably effective prior-art echo equalizers. In this connection, it is to be noted that with echo equalizers the visual compensation method is not usable.

Figure 6:
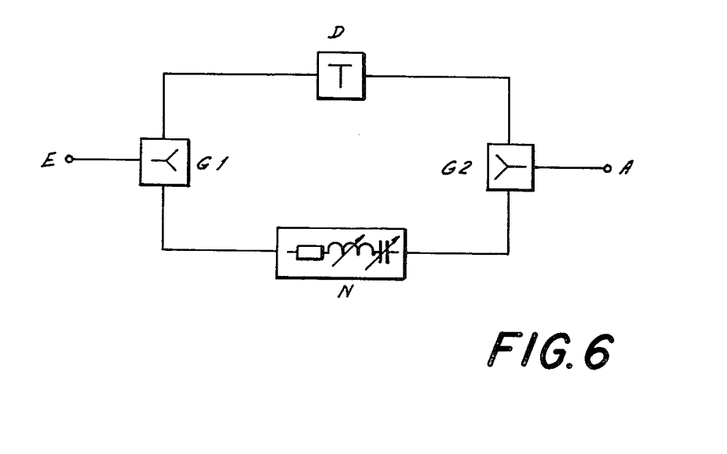
FIG. 6 is a greatly simplified overall view of the circuitry of the inventive equalizer.

FIG. 6 depicts in a greatly simplified manner the basic circuit concept utilized for practising the invention. The signal to be equalized is applied in a first fork G1 to a main path and to a shunt path connected parallel thereto. Both paths reunite in a second fork G2. Connected in the main path is a frequency-independent attenuation stage D. In the shunt path there is connected a circuit arrangement N which incorporates damped, adjustable series-resonant circuits and further transmission path forks, and which is operative for introducing a number of resonant-like elevations or depressions (bumps) into the attenuation versus frequency curve of the transmission system, the bumps being individually adjustable both with respect to their magnitude and their frequency location. The average attenuation introduced by the equalizer is set by the attenuation afforded by the frequency-independent attenuation stage D and the corresponding branches of the forks G1 and G2.

Figure 7:
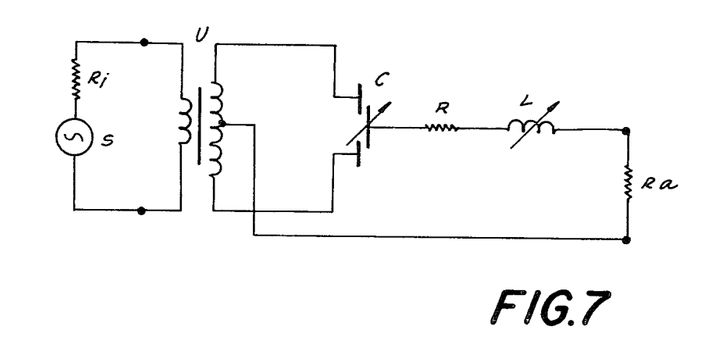
FIGS. 7 and 8 are only somewhat more detailed depictions of two different versions of the equalizer depicted in FIG. 6.
Figure 8:
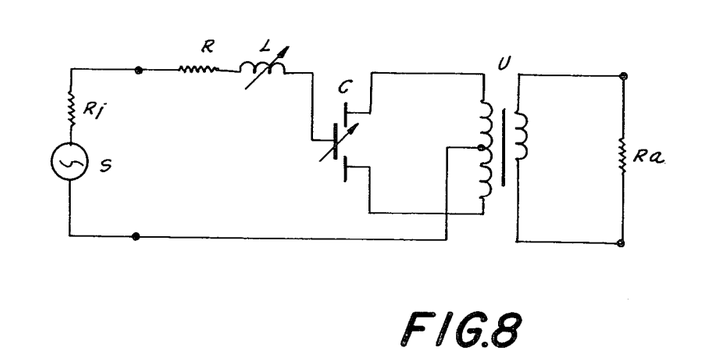

For adjusting the magnitude of the bumps, use is made of differential capacitors such as described for example in publication 1 listed below. With a differential capacitor the sum of the two component capacitances is constant; accordingly it is possible to resort to either a voltage-divider or a current-divider compensation expedient, with the capacitance of the divider actually effective in a resonant circuit being constant. These two possibilities are depicted in FIGS. 7 and 8, in which the signal source S of internal resistance Ri symbolizes the shunt output of the first fork G1 of FIG. 6. In FIG. 7, the signal source S is a voltage source which energizes a symmetry transformer U. Connected to the outer terminals of the secondary winding of this symmetry transformer are the two stators of the differential capacitor C. There is available at the rotor terminal of the differential capacitor C a voltage which is of either selected polarity relative to the center tap of the secondary winding of the transformer and which furthermore is continuously adjustable. The rotor terminal is connected via the series combination of a resistor R and an inductor L to one output terminal; the other output terminal of the circuit is connected to the center tap of the secondary winding. The output resistor Ra connected across the output terminals constitutes the shunt input of the second fork G2 of FIG. 6. If the internal resistance Ri and the output resistance Ra are small, then the maximum output current and accordingly the maximum bump magnitude will be essentially determined by the resonant circuit resistance R. The magnitude and polarity of each bump are dependent upon the setting of the associated differential capacitor C; the position of the bump within the frequency range in question is determined by the inductance of inductor L which is accordingly to be a continuously adjustable inductor. The two adjustments are independent of each other.

The circuit depicted in FIG. 8 operates in the same way, but here the differential capacitor C in cooperation with an output symmetry transformer U acts as a current divider.

Figure 9:
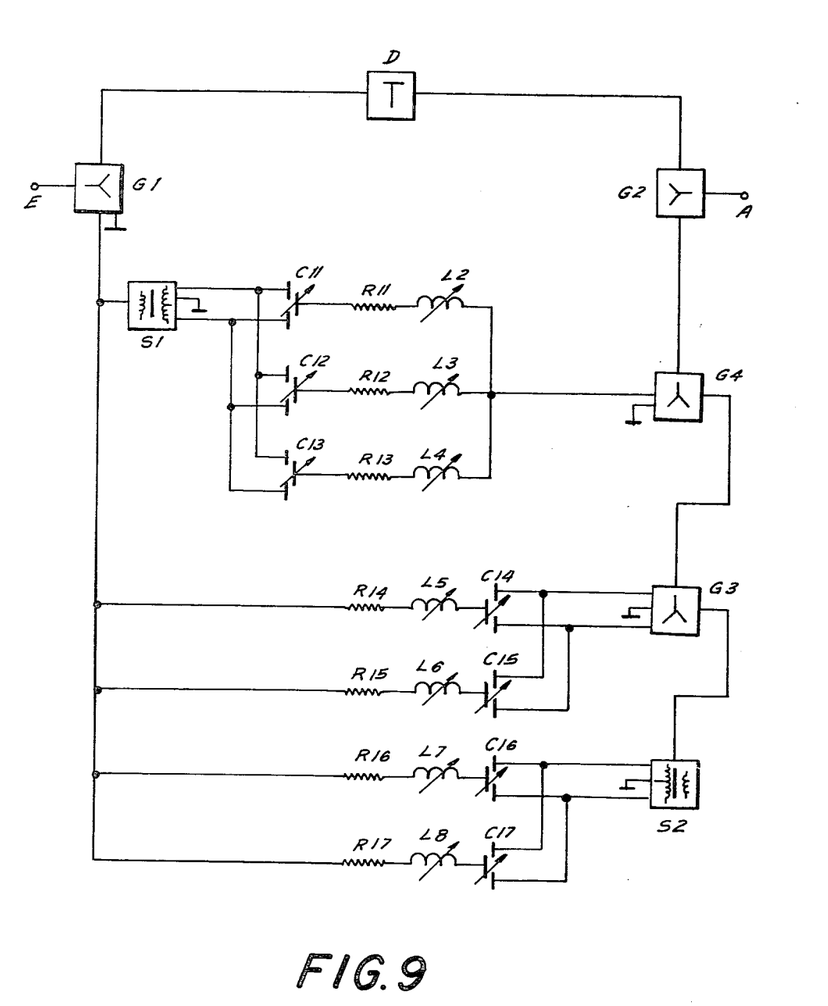
FIG. 9 is a quite detailed, but still somewhat simplified, circuit diagram of an embodiment of the equalizer generally depicted in FIG. 6.

FIG. 9 depicts a circuit in accordance with the principles of FIG. 6, the circuit arrangement N being made up of a plurality of stage connected in parallel and corresponding to those shown in FIGS. 7 and 8. These parallel stages share the same signal source and output resistor. The signal source constitutes the shunt output of the first transmission path fork G1, and the output resistor is the shunt input of the second transmission path fork G2. The first three resonant circuits with their differential capacitors C11, C12, C13 operate according to the voltage-divider principle. The remaining four resonant circuits with their differential capacitors C14, C15, C16, C17 operate according to the current-divider principle. The resonant frequencies of the resonant circuits correspond to the middle frequencies of the individual bumps. These frequencies are distributed at least approximately in correspondence to the detail density distribution curve within the frequency range to be equalized, and in such a manner that the resonant circuit having differential capacitor C11 produces the bump of highest frequency while that having differential capacitor C17 produces the bump of lowest frequency.

The first three resonant circuits share the symmetry transformer S1 and are connected at their output ends to one another directly and to the summing fork G4. The other four resonant circuits are organized in groups of two parallel circuits, with the last two being joined via the symmetry transformer S2 and connected like the first two of the group to the transmission path fork G3. To this end, the transmission path fork G3 is designed as a symmetry transformer.

Figure 10:
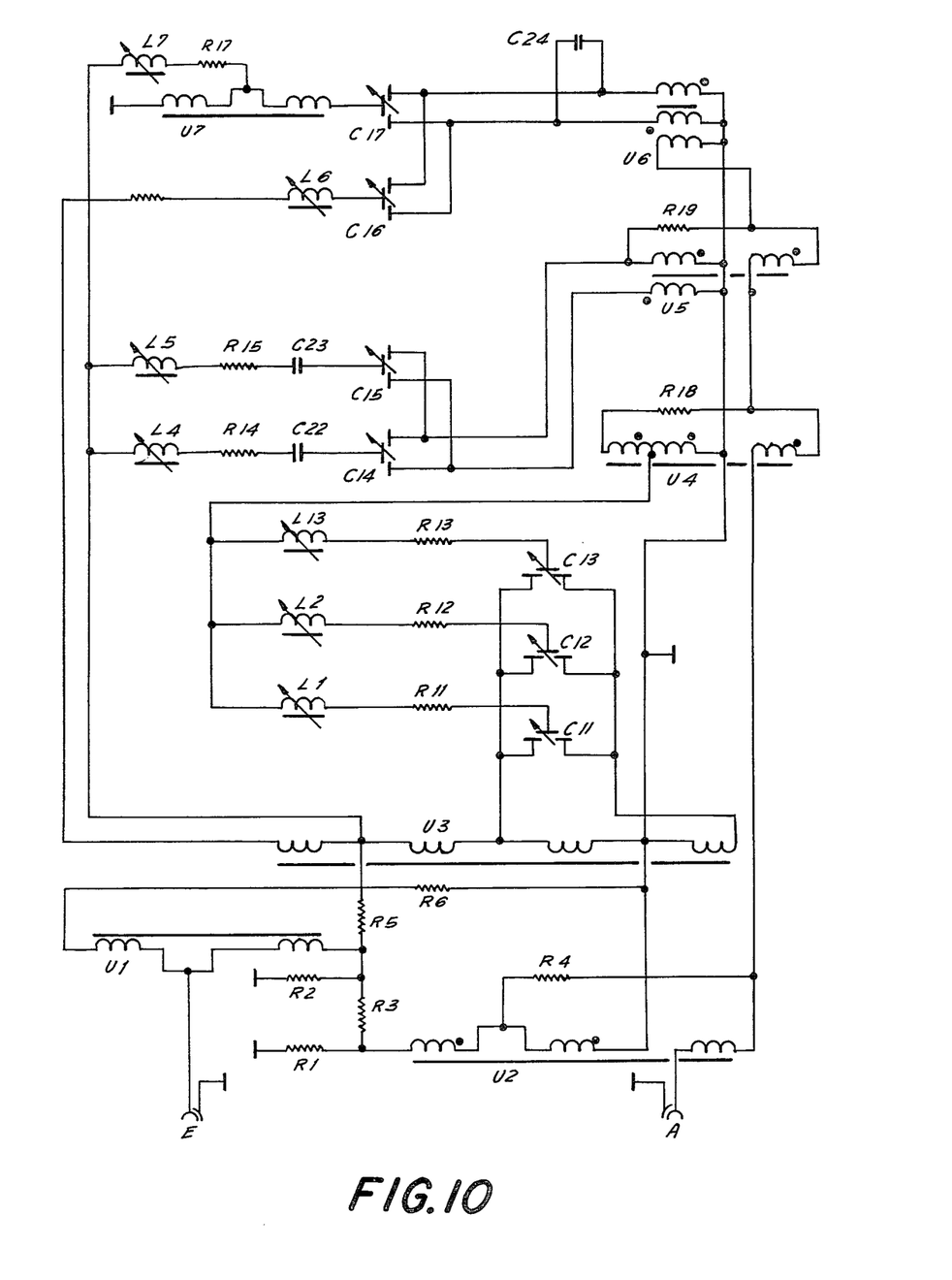
FIG. 10 is a non-simplified circuit diagram of the equalizer of FIG. 9.

The circuit of FIG. 9 is depicted in still greater detail in FIG. 10. Connected to the input terminal E is the first fork, here constituted by the first transformer U1 in conjunction with the resistor R5. The attenuation stage connected in the main transmission path is realized using resistors R1, R2, R3. The second transmission path fork is constituted by the transformer U2 in cooperation with the resistor R4 and is connected to the output terminal A. The resistor R6 constitutes the output resistor of the main output of the first fork.

The transformer U3 is the symmetry transformer S1 of FIG. 9 and additionally operates as an impedance transformer for the first three resonant circuits. The forks G3 and G4 of FIG. 9 are realized in FIG. 10 using the transformer U5 in cooperation with the resistor R19 and using the transformer U4 in cooperation with the resistor R18. The individual resonant circuits are comprised of the differential capacitors C11–C17, the inductors L1–L7, and the resonant-circuit resistors R11–R17. If it should happen that differential capacitors of the required capacitance values are not available, additional trimming capacitors can be inserted, as indicated by way of example with respect to the fourth and fifth resonant circuits having series capacitors C22 and C23. The transformer U7 serves to transform impedance, and the capacitor C24 is inserted to decouple the adjoining circuit stages. The individual resonant circuits are each so dimensioned that the middle frequencies of the respective bumps are each shiftable by an amount equal to at least one half the distance to the respective neighboring bump. Furthermore, the point of intersection between the overlapping facing flanks of adjoining bumps is located at least 0.6 of the way up the height of the bump.

Publication 1:
Federal Republic of Germany patent DPS No. 1,805,461

Publication 2:
Koiebi Endo, Takamoto Kojima, Hirosuke Tanaka, Michio Fujisaka and Koichi Watanabe: Wide-Band Adjustable Equalizer Based on the Sampling Theorem, Electronics and Communications in Japan, Vol. 53-A, No. 3, 1970.

Publication 3:
Federal Republic of Germany allowed patent application DAS No. 1,487,298.

It will be understood that each of the elements described above, or two or more together, may also find a useful application in other types of circuits and constructions differing from the types described above.

While the invention has been illustrated and described as embodied in an equalizer making use of resonant circuit stages utilizing differential capacitors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An equalizer of the type operative for equalizing the attenuation-versus-frequency curve of a signal carrier transmission system within a predetermined frequency range by providing a compensatory attenuation-versus-frequency transfer function compensating for the unequalized attenuation-versus-frequency curve of the signal carrier transmission system,
the equalizer comprising
input circuit means;
output circuit means;
N compensating means connected between the input and output circuit means of the equalizer and operative for establishing a compensatory attenuation-versus-frequency transfer function comprised of N compensatory attenuation-versus-frequency-curve bumps,
each of the N compensating means comprising a respective reactor-resistor circuit stage operative for establishing a respective one of the N bumps of the compensatory transfer function of the equalizer,
each reactor-resistor circuit stage including amplitude-selecting means adjustable for changing the amplitude of the respective compensatory bump,
each reactor-resistor circuit stage furthermore including frequency-selecting means adjustable for shifting the frequency of the extreme-amplitude point of the respective compensatory bump between the minimum and maximum end frequencies of a respective one of N different frequency ranges,
each of the N different frequency ranges including a middle frequency midway between the minimum and maximum end frequencies of that frequency range,
the difference between the middle frequency and the end frequencies within each frequency range being in excess of one half the difference between the middle frequency of that frequency range and the middle frequency of the adjoining frequency range,
the flanks of each two adjoining compensatory bumps overlapping and intersecting at a point which is at least 0.6 of the amplitudes of the two adjoining bumps whenever the amplitudes of the two adjoining bumps are set to equal values,
the N middle frequencies being substantially equidistantly spaced when measured along a normalized frequency axis the constituent portions of which have been expanded and compressed in correspondence to the function d*, wherein $$d^* = k \cdot 10^{[3.76q - 5.32\sqrt{q} + 2.07]}$$

k is a simple proportionality constant and
q is normalized frequency $f/f_{max}$.

2. The equalizer defined in claim 1, each reactor-resistor circuit stage being a resonant circuit stage.

3. The equalizer defined in claim 2, each resonant circuit stage comprising a resistor, an adjustable capacitor which constitutes the respective amplitude-selecting means, and an adjustable inductor which constitutes the respective frequency-selecting means.

* * * * *